May 19, 1931.                C. MACMILLAN                 1,805,492
                  PROTECTIVE DEVICE FOR INDUCTION MOTORS
                          Filed Oct. 23, 1928
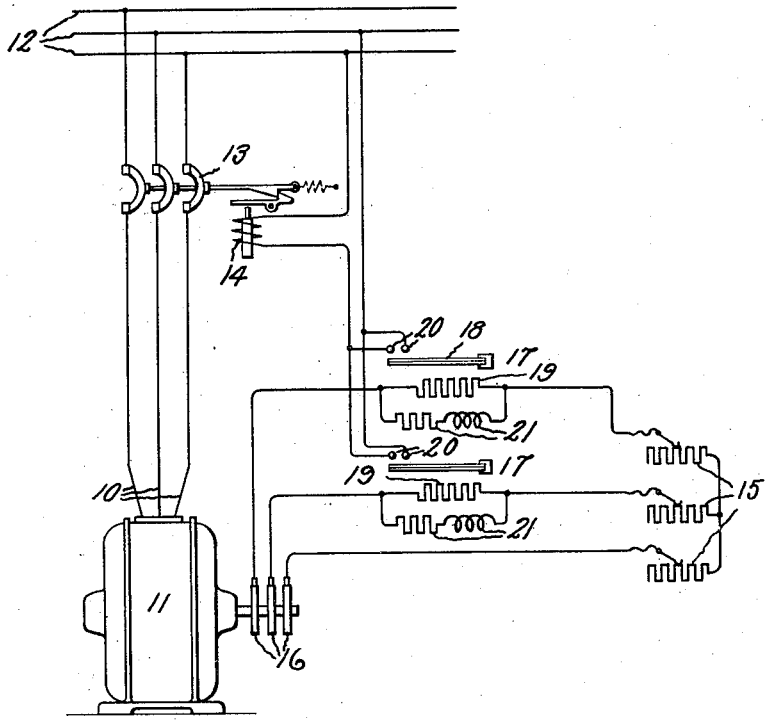
                                        Inventor:
                                    Campbell Macmillan,
                                    by Charles E. Tullar
                                           His Attorney Patented May 19, 1931

1,805,492

UNITED STATES PATENT OFFICE

CAMPBELL MACMILLAN, OF SCHENECTADY, NEW YORK, ASSIGNOR TO GENERAL ELECTRIC COMPANY, A CORPORATION OF NEW YORK

PROTECTIVE DEVICE FOR INDUCTION MOTORS

Application filed October 23, 1928. Serial No. 314,463.

My invention relates to protective devices for induction motors.

It has been the practice heretofore to connect the primary winding of induction motors to a source of alternating current by circuit breakers which are controlled by a protective device connected in circuit with the primary windings of the motor. These protective devices have ordinarily been responsive only to an electrical condition in the primary circuit of the motor and were not dependent on the speed of the rotor so that they did not afford complete protection to the motor. This is due to the fact that when the speed of the rotor is reduced the dissipation of heat from the machine is greatly reduced on account of decreased ventilation, and the current in the rotor which would be permissible at normal operating speed would cause overheating of the motor when the rotor is reduced in speed or stalled.

The object of my invention is to provide a protective device for induction motors which will disconnect the primary winding from the alternating current circuit at a predetermined current in the rotor at normal speed, and which will disconnect the primary winding from the alternating current circuit at a lesser current in the rotor circuit as the speed of the rotor decreases. In this way the motor will be amply protected against overheating throughout the entire range of variation of speed of the rotor because the maximum current which is permitted to flow in the rotor circuit decreases in accordance with the decrease in speed thereof and the consequent reduction in its capacity for the dissipation of heat due to decreased ventilation.

I accomplish this object by connecting the primary winding of the motor to a source of alternating current and providing an arrangement responsive to a predetermined frequency and current in the rotor circuit for disconnecting the primary winding of the motor from the alternating current circuit.

In the drawing the single figure diagrammatically illustrates my invention as applied to an induction motor having a wound rotor and resistance connected thereto for adjusting the torque characteristic thereof, The terminals 10 of the primary winding of the induction motor 11 are connected to alternating current mains 12 by means of a circuit breaker 13 having a trip coil 14 for disconnecting the primary winding from the alternating current mains. The rotor of the induction motor is provided with a winding which is connected to resistances 15 through slip rings 16 carried by the rotor shaft for controlling the torque-speed characteristics of the motor.

When the motor is operating at normal speed the air circulation therethrough will be a maximum and the capacity of the machine for dissipating heat is a maximum. If the speed of the motor decreases the circulation of air therethrough will be decreased and the capacity of the motor for dissipating heat will be correspondingly decreased. It is therefore apparent that as the speed of the motor is decreased the maximum amount of current which is permissible in a rotor circuit without excessive heating is correspondingly decreased.

In accordance with my invention, therefore, I provide an arrangement controlled by the current and speed of the rotor which disconnects the machine from the primary circuit, and is so arranged that the maximum current which is permitted to flow in the rotor circuit before the motor is disconnected from the alternating current circuit is decreased in accordance with the decrease in speed of the rotor. Although any suitable device may be employed for this purpose, I prefer to use a frequency and current controlled thermal relay 17 which provides a slight time delay between the occurrence in the rotor circuit of the combined frequency and current required to disconnect the primary winding from the alternating current circuit and the opening of the circuit between them. The thermal relay which I have shown in the drawing for controlling circuit breaker 13, in this manner, includes a bi-metallic element 18 having a heating coil 19 and contacts 20 which are arranged to complete a circuit between the trip coil 13 and the alternating current mains 12 when the heating coil 19 is energized sufficiently to move the bi-metallic element 18 into engagement with the contacts. At full speed of the motor the frequency in the rotor circuit will be quite low and as the speed thereof is decreased due to changes in the adjustment of the resistance 15 or on account of a change in load thereon, the frequency in the rotor circuit will increase. In order to control the heating of the coil 19 in accordance with the frequency and current in the rotor circuit, I connect the same in the rotor circuit in parallel with the reactance 21, the impedance of which increases with the frequency in the rotor circuit. This impedance is of such value that when the motor is running at normal speed and the frequency is low in the rotor circuit a large proportion of current in the rotor circuit flows through the reactance 21 and the heating of the coil 19 will not be sufficient to cause the bi-metallic element 18 to bridge the contacts 20 until the motor is substantially overloaded. As the speed of the motor decreases, however, the frequency in the rotor circuit increases and a large proportion of the current flowing in the rotor circuit flows through the heating coil 19, so that the bi-metallic element 18 will be caused to bridge contacts 20 at very much less current in the rotor circuit than at normal speed of the rotor. In this way the current flowing in the rotor circuit at normal speed does not open the circuit breakers 13 and disconnect the primary winding from the alternating current circuit until it is substantally overloaded, and when the speed thereof decreases the current flowing in the rotor circuit which will disconnect the motor from the alternating current circuit is made small enough to prevent overheating of the motor. Moreover, the rotor current required to disconnect the motor from the alternating current circuit is caused to vary directly as the speed of the rotor and inversely as the frequency of the rotor circuit.

Inasmuch as the current flowing through the resistances 15 may not be equal on account of the slight difference in adjustment thereof, I prefer to arrange a thermal relay 17 in two of the circuits between the resistance 15 and the slip rings 16 so as to insure opening of the circuit breakers 13 at the frequency and current in the rotor circuit required to prevent overheating of the motor.

Modifications of the particular protective arrangement for induction motors which I have disclosed, will occur to those skilled in the art so that I do not desire my invention to be limited to the particular arrangement set forth except as defined in the appended claims.

What I claim as new and dseire to secure by Letters Patent of the United States, is:

1. An induction motor having a primary winding connected to an alternating current circuit and a rotor winding, and means controlled by the frequency and current in said rotor winding for disconnecting said primary winding from said alternating current circuit in response to different values of rotor current as the frequency thereof varies.

2. An induction motor having a primary winding connected to an alternating current circuit and a rotor winding, and means connected in a circuit with said rotor winding and responsive to the combined action of frequency and current thereof for disconnecting said primary winding from said alternating current circuit.

3. An induction motor having a primary winding connected to an alternating current circuit and a rotor winding, and means for effecting the disconnection of said primary winding from said alternating current circuit in response to a value of current in the rotor winding which varies inversely with the frequency thereof, said means including a time element device jointly controlled by the current and the frequency of the rotor circuit.

4. An induction motor having a primary winding connected to an alternating current circuit and a rotor winding, and means including a thermal responsive device connected in a circuit with said rotor winding controlled by the frequency and current therein for disconnecting said primary winding from said alternating current circuit.

5. An induction motor having a primary winding connected to an alternating current circuit and a rotor winding, and means including a resistance and reactance connected in parallel in a circuit with said rotor winding controlled by the frequency and current therein for disconnecting said primary winding from said alternating current circuit.

6. An induction motor having a primary winding connected to an alternating current circuit and a rotor winding, and thermal responsive means including a heating coil and a reactance connected in parallel in said rotor winding controlled by the frequency and current therein for disconnecting said primary winding from said alternating current circuit.

7. An induction motor having a primary winding connected to an alternating current circuit and a rotor winding, a resistor connected in circuit with said rotor winding for controlling the torque characteristic of said motor, and means connected in a circuit with said resistance to be responsive to different values of rotor current as the frequency thereof varies for disconnecting said primary winding from said alternating current circuit.

8. An induction motor having a primary winding connected to an alternating current circuit and a rotor winding, a resistor connected in a circuit with said rotor winding for controlling the torque characteristic of said motor, means including a thermostatic element for disconnecting said primary winding from said alternating current circuit, and means including a heating coil for said thermostatic element and a reactance connected in parallel in a circuit with said rotor winding for heating said thermostatic element so as to disconnect said primary winding from said alternating current circuit upon the occurrence of a predetermined frequency and current in said rotor winding.

In witness whereof, I have hereunto set my hand this 22nd day of October, 1928.

CAMPBELL MACMILLAN.